United States Patent
Dautelle

(10) Patent No.: US 7,436,406 B2
(45) Date of Patent: Oct. 14, 2008

(54) SCENE GRAPH BASED DISPLAY FOR DESKTOP APPLICATIONS

(75) Inventor: Jean-Marie R. Dautelle, Marlboro, MA (US)

(73) Assignee: Raytheon Company, Waltham, MA (US)

( * ) Notice: Subject to any disclaimer, the term of this patent is extended or adjusted under 35 U.S.C. 154(b) by 152 days.

(21) Appl. No.: 10/617,599

(22) Filed: Jul. 11, 2003

(65) Prior Publication Data

US 2004/0039496 A1     Feb. 26, 2004

Related U.S. Application Data

(60) Provisional application No. 60/395,643, filed on Jul. 12, 2002.

(51) Int. Cl.
*G06T 11/00* (2006.01)
*G06T 13/00* (2006.01)
*G01S 7/20* (2006.01)

(52) U.S. Cl. ............... 345/441; 345/473; 342/176

(58) Field of Classification Search ......... 345/441–443, 345/473, 474, 619; 342/176
See application file for complete search history.

(56) References Cited

U.S. PATENT DOCUMENTS

| | | | |
|---|---|---|---|
| 5,513,316 A | 4/1996 | Rodrigues et al. | |
| 5,649,032 A | 7/1997 | Burt et al. | |
| 5,717,879 A | 2/1998 | Moran et al. | |
| 5,893,053 A | 4/1999 | Trueblood | |
| 5,943,445 A | 8/1999 | Dufaux | |
| 5,977,983 A * | 11/1999 | Einkauf et al. | 345/582 |
| 6,205,260 B1 | 3/2001 | Crinon et al. | |
| 6,272,568 B1 | 8/2001 | Ishihara | |
| 6,317,131 B2 * | 11/2001 | Basso et al. | 345/474 |
| 6,420,698 B1 * | 7/2002 | Dimsdale | 250/234 |
| 6,445,740 B1 * | 9/2002 | Mallart et al. | 375/240.08 |
| 2002/0063713 A1 | 5/2002 | Sowizral et al. | |
| 2003/0222883 A1 | 12/2003 | Deniau et al. | |
| 2004/0110490 A1 * | 6/2004 | Steele et al. | 455/412.1 |

FOREIGN PATENT DOCUMENTS

| | | |
|---|---|---|
| EP | 0 398 555 | 11/1990 |
| EP | 0 694 881 | 1/1996 |
| JP | 2000-114866 | 4/2000 |

(Continued)

OTHER PUBLICATIONS

Benjamin B. Bederson, Jon Meyer, Lance Good, Jazz: An Extensible Zoomable User Interface Graphics Toolkit in Java, May 2000, http://portal.acm.org/citation.cfm?id=354754&coll=ACM&dl=ACM&CFID=46921808&CFTOKEN=68192717, pp. 171-180.*

(Continued)

*Primary Examiner*—Jeffrey A. Brier
(74) *Attorney, Agent, or Firm*—Daly, Crowley, Mofford & Durkee, LLP

(57) ABSTRACT

A method and apparatus for rapidly displaying air traffic control (ATC) information on an ATC display provides a two-dimensional (2D) scene graph and associated 2D scene graph display commands in conjunction with a thee-dimensional graphic card. In other embodiments, any desktop application software can make use of a 2D scene graph and associated 2D scene graph display commands in order to rapidly render a 2D display.

24 Claims, 5 Drawing Sheets

FOREIGN PATENT DOCUMENTS

WO     WO 00/68840     11/2000

OTHER PUBLICATIONS

Benjamin B. Bederson, Britt McAlister, Jazz: An Extensible 2D+Zooming Graphics Toolkit in Java, May, 1999, 10 pages, http://www.cs.umd.edu/hcil/piccolo/learn/papers/HCIL-99-07.pdf.*

Stéphane Conversy and Jean-Daniel Fekete, The svgl toolkit: enabling fast rendering of rich 2d graphics, Jan. 2002, Technical Report 02/1/INFO, Ecole des Mines de Nantes, 11 pages. http://www.lri.fr/~conversy/publications/emn2002.pdf.*

Thomas Pabst, NVIDIA Strikes Back—The GeForce2 Ultra 3D Monster, Aug. 14, 2000 13:00, pp. 1-6 www.tomshardware.com/2000/08/14/nvidia_strikes_back_/index.html.*

Hercules 3D Prophet II GTS 64MB For $100 less, the 32MB version of this board is a better value, Thursday, Aug. 3, 2000 12:00 AM PDT, pp. 1-3 www.pcworld.com/article/17608-1/article.html.*

Crowley; "TkReplay: Record and Replay in Tk;" Third Annual Tcl/Tk Workshop; Toronto, Canada: Jul. 1995: (10 pages).

PCT Search Report; PCT/US2003/21813 dated Apr. 8, 2005.

PCT Search Report; Application No. PCT/US03/21812; dated Oct. 20, 2004.

Cunningham et al.; "Lessons from Scene Graphs: Using Scene Graphs to Teach Heirarchial Modeling;" internet article from www.cs.csustan.edu/nrsc/nsf/scenegraphg/pdf; 13 pages.

RM Scene Graph Product Overview; internet article from http://www.r3vis.com/RMSSceneGraph/overviewinfo.html; two pages.

Baker; "SSG: A Simple Scene Graph APO for OpenGL;" internet article from http://plib/sourceforge.net/ssg/; three pages.

Dautelle; "Asynchronous Recording of Real-Time Systems;" Raytheon Cmpany 2002; 2nd Systems/Software Engineering Symposium, Apr. 8-10, 2003; six pages.

Dautelle; "Asynchronous Recording of Real-Time Systems;" Raytheon Cmpany 2002; 2nd Systems/Software Engineering Symposium, Apr. 8-10, 2003; MicroSoft PowerPoint presentation, pp. 1-13.

"Scene Description and Management: The Scene Graph;"Chapter 1; internet article from http://www.csc.calpoly.edu/~hitchner/CS471.W2003/SceneGraph.pdf; 28 pages.

* cited by examiner

SCENE GRAPH BASED DISPLAY FOR DESKTOP APPLICATIONS

CROSS-REFERENCE TO RELATED APPLICATIONS

This application claims the benefit under 35 U.S.C. §119 (e) of U.S. Provisional Patent Application No. 60/395,643 filed Jul. 12, 2002, which application is hereby incorporated herein by reference in its entirety.

STATEMENTS REGARDING FEDERALLY SPONSORED RESEARCH

Not applicable.

FIELD OF THE INVENTION

This invention relates generally to graphical display method and systems and more particularly to a method and system for rapidly displaying two-dimensional (2D) information.

BACKGROUND OF THE INVENTION

As is known in the art, air traffic control (ATC) is a service that promotes the safe, orderly, and expeditious flow of air traffic. ATC services can assist in promoting safe air travel by providing information which assists in safety, preventing collisions with other aircraft, obstructions, and the ground; assisting aircraft in avoiding hazardous weather; assuring that aircraft do not operate in an airspace where operations are prohibited; and assisting aircraft in distress. ATC services can also assist in the orderly and expeditious flow of aircraft, which helps the efficiency of aircraft operations along the routes selected by the operator.

As is also known, air traffic control services are provided by air traffic control (ATC) systems. An air traffic control system typically includes a computer and display system that processes data received from air surveillance radar systems for the detection and tracking of aircraft. Air traffic control systems are used for both civilian and military applications to determine the identity and locations of aircraft in a particular geographic area.

When an aircraft is detected by an ATC radar system, information concerning the aircraft is provided to a display such that a user can look at the display and observe the position of the aircraft with respect to other aircraft as well as with respect to other moveable and non-moveable ground and air-based objects (e.g., an ATC tower, a passenger terminal, moving vehicles etc.)

Techniques for displaying the locations of aircraft and other objects on a display system are known. Such display systems, however, must be able to rapidly display a relatively large amount of information (e.g., information in maps). Furthermore, such display systems should allow a user to manipulate the information (e.g., by panning or zooming). When the information is manipulated, however, it is desirable for the display system to have a rapid real-time response.

The problem of providing rapid real-time displays of manipulated information (e.g., zoomed-in map information) is exacerbated when so-called "fill maps" (i.e., a map with fill inside a map boundary) must be shown on the display, since it is relatively difficult to rapidly fill a map boundary during a zoom or a pan operation. To address this problem, so-called "outline maps," also known as "stroked maps," have been used. Also, many applications, including ATC applications, have displays which include a relatively large number of images, including buttons, aircraft icons, vector displays, windows, etc., and the large number of images is difficult to rapidly display.

There is also a need to be able to rapidly display an image (e.g., a map or an aircraft image) having a relatively large amount of interactive feedback. For example, when an aircraft icon is selected, information related to that aircraft can also be displayed to the user.

Prior art display systems typically utilize stroked maps and do not generally allow rapid real-time display of maps and other display information (e.g., targets, vectors, etc.). For prior art ATC systems, it is difficult to rapidly render a display without impacting the real-time system operation of the ATC system.

Prior art attempts to provide rapid real-time display systems include systems that only partially render or re-render the display. For example, when a section of a map is selected, only that section of the display is rendered. While this approach works well when selecting only a portion of the map, it does not work well when the entire map is selected and must be re-rendered, for example when the user performs a zoom or a pan operation.

Another prior art solution that provides a real-time display uses so-called "multiple buffers" or "multiple layers." In this approach, the display is divided into different layers (e.g., buttons are on one layer, a map background is on another layer, targets are on yet another layer, etc.). This approach works well if moving an object (i.e., an image) on only one layer because it is not necessary to re-render the other layers. This approach does not work well for pan or zoom operations, however, since in those operations, it is necessary to re-render multiple layers.

It would, therefore, be desirable to provide a display system and technique to overcome the aforesaid and other disadvantages.

SUMMARY OF THE INVENTION

A technique for displaying two-dimensional (2D) information on an air traffic control (ATC) system display is provided by representing the information to be displayed as a 2D scene graph having corresponding 2D scene graph display commands, and uploading the 2D scene graph to a three-dimension graphics card (3DGC), which is adapted to generate 2D images on the graphical display in response to the 2D scene graph. By using a 2D scene graph with a 3DGC, only a relatively small number of commands are needed to draw or render corresponding 2D images on a graphical display. Therefore, the 2D images can be rapidly drawn on the graphical display.

In accordance with the present invention, a method of providing a graphical display includes generating scene graph data having at least one two-dimensional object and storing the scene graph in a graphics module capable of generating a graphical display. The method also includes generating a scene graph display command associated with the two-dimensional object, wherein the scene graph display command is adapted to be interpreted by the graphics module, resulting in a two-dimensional image on the graphical display associated with the two-dimensional object. In one particular embodiment, the graphics module is a three-dimensional graphics circuit card.

In accordance with another aspect of the present invention, a computer program medium having computer readable code thereon provides instructions for generating scene graph data having at least one two-dimensional object and for storing the scene graph in a graphics module capable of generating a graphical display. The computer program medium also provides instructions for generating a scene graph display command associated with the two-dimensional object, wherein the scene graph display command is adapted to be interpreted by the graphics module, resulting in a two-dimensional image on the graphical display associated with the two-dimensional object. In one particular embodiment, the graphics module is a three-dimensional graphics circuit card (3DGC).

In accordance with another aspect of the present invention, a system for providing a graphical display includes a scene graph display command generator for generating a scene graph display command associated with a two-dimensional object. The scene graph display command is adapted to be interpreted by a graphics module, resulting in a two-dimensional image on the graphical display, and the two-dimensional image is associated with the two-dimensional object.

With the 2D scene graph display commands of the present invention, images can be rendered on a graphical display more rapidly than the same images can be rendered using prior art techniques.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
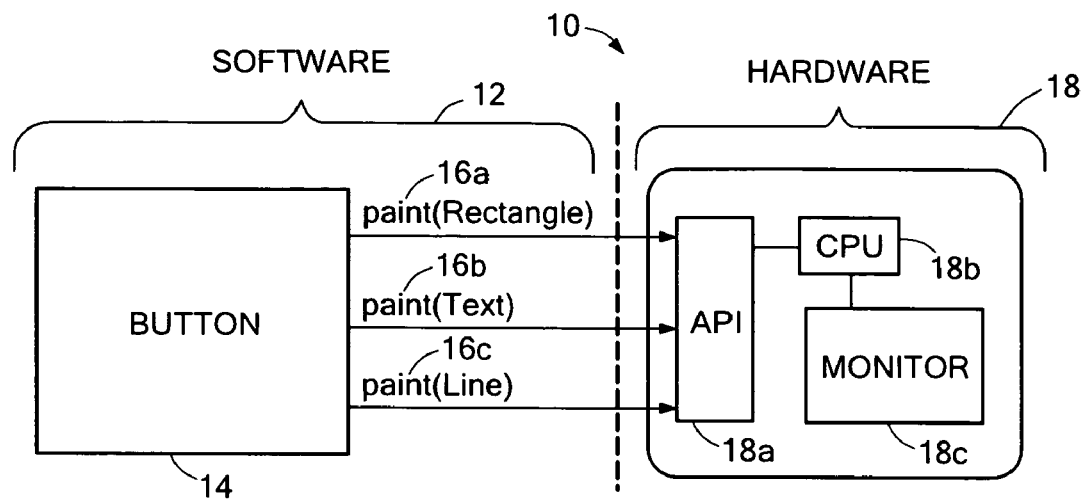
FIG. 1 is a block diagram of prior art system for re-painting a single button on a display.

Before describing a scene graph based display for desktop applications, some introductory terms are described. A scene graph will be understood to be a particular representation containing information about the geometry and appearance of all objects appearing on a graphical display. The scene graph is a dynamic data structure within a computer program. The scene graph can be saved as a file. The scene graph includes data that describes shape objects (geometry and appearance), geometric structure relationships (geometric transformations, ordering, and grouping), global objects (how all shape objects are viewed, e.g., viewpoints, lights, backgrounds), and behaviors (procedures for modifying information stored in a scene graph).

In one embodiment, the scene graph is implemented using object-oriented computer programming techniques. Thus, the scene graph objects can be provided as object-oriented software objects, which describe the shape objects. Scene graph commands can also perform the behaviors upon the shape objects. For example, a scene graph can include a software object associated with an aircraft image, and a scene graph display command can operate on the aircraft object to render the aircraft image on a graphical display.

The objects of a scene graph are generated using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs." The scene graph data structure described above underlies the tree structure representation. The scene graph can also be associated with a sequence of display commands, which can be used to generate the underlying data structure of the scene graph.

Thus, as used herein, the term "scene graph" is used to describe the underlying data structure and commands associated with a scene graph, as opposed to solely the set of scene graph display commands or the scene graph tree structure.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programming interfaces (APIs) have been established to create a scene graph when presented with the scene graph display commands. For example Java3D and VRML provide high-level software to generate a scene graph. Lower level APIs have also been provided, including Open GL, and Direct 3D. Application software, for example computer games, has been developed to provide the scene graph display command to the API.

Scene graph techniques are conventionally used to provide a scene graph associated with three-dimensional images on a graphical display, for example in computer games. To this end, software manufacturers have provided the three-dimensional (3D) applications and APIs described above. Also, hardware manufacturers have provided 3D graphics circuit boards, having local processing capability on the graphical circuit board, and having the ability to interpret scene graph data and rapidly provide a corresponding graphical display on a monitor.

The scene graph programming techniques, in conjunction with the 3D graphic circuit board, provide the ability to rapidly render a 3D image on a graphical display with minimal impact on a central computer processor. Images on the graphical display can also be rapidly updated with one or more display commands, provided by the application software, interpreted by the API, and sent to the 3D graphics circuit board.

While existing scene graph application software and APIs provide three-dimensional (3D) graphical objects and corresponding 3D images on a graphical display, a conventional air traffic control (ATC) display provides two-dimensional (2D) images. It should be appreciated that in ATC systems as well as other 2D imaging applications, two-dimensional images are conventionally provided without use of scene graphs and without taking advantage of the local processing capability of the 3D graphics circuit board.

That is, in those systems and application, such as ATC systems, which require only two-dimensional imaging, 2D images are conventionally generated with APIs that can interpret a primitive "paint" command. A single paint command is able to render only a simple shape, for example a line or a rectangle. Therefore, in order to render more complex shapes on an ATC display, such as aircraft and geographic features, numerous paint commands are conventionally generated, which are then interpreted by a low level API in conjunction with an ATC central processor. Therefore, the conventional ATC display requires substantial processing time provided by the ATC central processor, in order to process the large number of primitive "paint" commands.

Also, existing scene graph APIs provide three-dimensional (3D) graphical objects and corresponding 3D images on a graphical display in particular software environments, for example, in computer games. However, scene graphs have not been applied to other software environments, for example, two-dimensional (2D) desktop applications having combinations of 2D windows, 2D text, and 2D graphics.

Referring now to FIG. 1, an example of a prior art system 10 for placing a button 14 (including associated text) on a monitor 18c includes a software application portion 12, which characterizes the button in terms of primitive "paint" display commands 16a-16c. The software application 12 sends display commands 16a-16c to the hardware 18, e.g., to a low-level application programming interface (API) 18a. A central processing unit (CPU) 18b, draws or "paints" the button 14 on the monitor 18c. In the example of FIG. 1, the button 14 is painted on the monitor 18c using three primitive "paint" display commands 16a-16c (i.e., paint (rectangle), paint (text), and paint (line)). Using these three primitive "paint" display commands 16a-16c, the software application 12 is able to cause the hardware 18 to display an image of the desired button 14.

The hardware 18 can include a personal computer (PC) or a workstation, and the "paint" display commands 16a-16c can be received and interpreted by an API, for example the API 18a within the PC or workstation.

Figure 2:
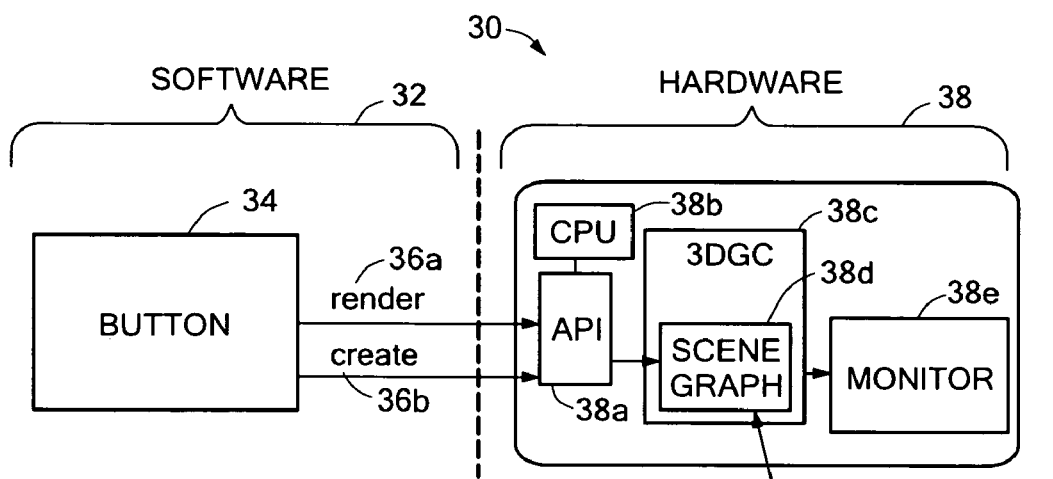
FIG. 2 is a block diagram of a system, which utilizes a scene graph to provide a two-dimensional image on a graphical display.

Referring now to FIG. 2, in accordance with the present invention, a system 30 that utilizes two-dimensional (2D) scene graph display commands 36a-36b provided by a software application 32 is shown. In this example, a button 34 (including associated text) is represented by scene graph display commands 36a, 36b. One or more "create" commands 36b generate a scene graph data object corresponding to the button 34. The one or more "create" commands are received by hardware 38. The hardware 38 includes an API 38a which, in conjunction with CPU 38b, transforms the one or more "create" commands to scene graph data corresponding to a button object, and stores the button object to a scene graph 38d. Once the button object is stored to the scene graph 38d, the button object can be invoked by a single render display command 36a. The button object can be invoked any number of times by respective "render" commands in order to display any number of respective button images on the monitor 38e. This is in contrast to the prior art approach of FIG. 1 in which multiple primitive "paint" commands are required to display each button.

It should be appreciated that the "create" and "render" commands described above are but two exemplary scene graph display commands. Other command words can provide the same function as the "create" and "render" display commands 36a, 36b. Also there can be other scene graph display commands that perform other functions. Thus, it should be appreciated that although specific commands are sometimes referenced herein, such references are not intended to be limiting but rather are merely used to promote clarity in describing the invention.

The 3DGC 38c uses the scene graph 38d, which contains scene graph data corresponding to a button object, to render an image of the button 34 on a monitor 38e. The 3DGC 38c has local processing (not shown), and is therefore able to offload processing from the CPU 38b for display image generation.

It should be appreciated that the software application 32 must be able to generate 2D scene graph display commands in accordance with the present invention. It should still further be appreciated that the API 38a must be able to receive and transform the 2D scene graph display commands into 2D scene graph data that can be interpreted by the 3DGC 38c to provide 2D images on the monitor.

Figure 2A:
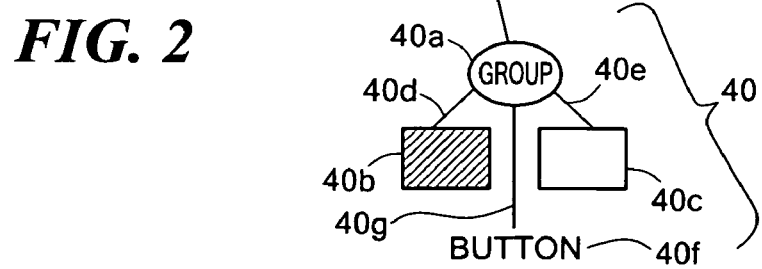
FIG. 2A in a tree diagram of a scene graph shown in FIG. 2.

Referring briefly to FIG. 2A, tree diagram 40 is a diagrammatic representation of the scene graph 38d, and diagrammatically represents the data underlying the scene graph. A "button" group 40a includes a button portion 40b, a border portion 40c, and a text portion 40f. Arcs 40d, 40e, and 40g couple the diagrammatic objects. While only a simple button object (including associated text) is shown, it should be realized that complex objects can similarly be diagrammatically represented and can similarly be associated with one or more "create" display commands.

Referring again to FIG. 2, the system 30 provides a rendering of the button 34 on the monitor 38e, wherein the button 34 has a two-dimensional (2D) image. By using the scene graph system 30, 2D display images can be rapidly rendered. A 2D display rendering speed improvement of an order of magnitude can be realized compared to the system 10 of FIG. 1, which uses primitive "paint" display commands. That is, by having the scene graph 38d stored directly on the 3DGC 38c and by limiting the software commands to occasional "render" display commands, (and other display commands corresponding to scene graph updates), a performance increase on the order of an order of magnitude can be realized.

The exemplary system 30 has the ability to greatly accelerate 2D desktop software applications. A 2D desktop software application will be recognized to have a variety of characteristic features, including, but not limited to, re-sizeable windows, buttons, panels, dropdown menus, text, etc.

Besides improved display rendering speed, the approach of the present invention has the following advantages: (1) scene graph rendering time can be easily predicted, which allows for synchronous or asynchronous updates of the display images; and (2) scene graph rendering is performed by hardware, leaving the primary CPU free to carry on others time-critical tasks (e.g., input/output).

Figure 3B:
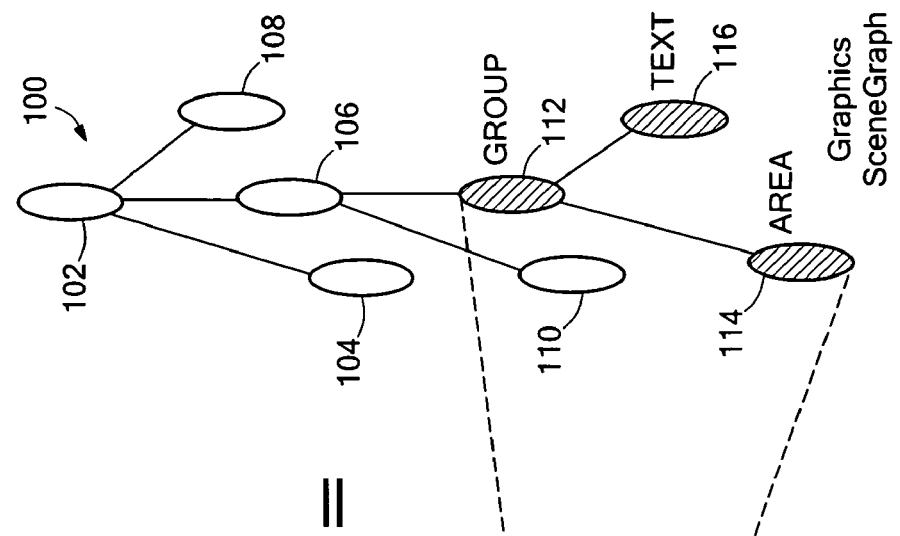
FIG. 3B is a block diagram of a scene graph object tree associated with a two-dimensional scene graph object of the scene graph of FIG. 3A.
Figure 3A:
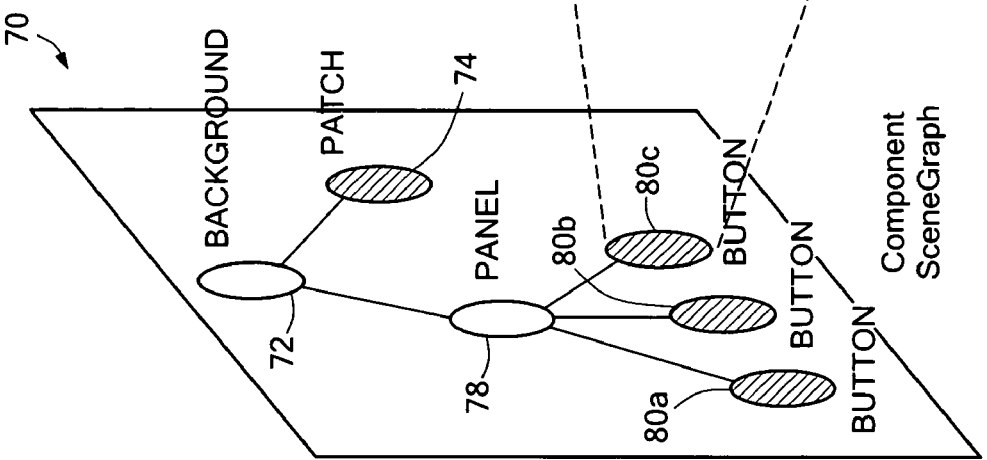
FIG. 3A is a block diagram showing a scene graph having a plurality of scene graph two-dimensional objects, each associated with a respective two-dimensional display image associated with FIG. 3.
Figure 3:
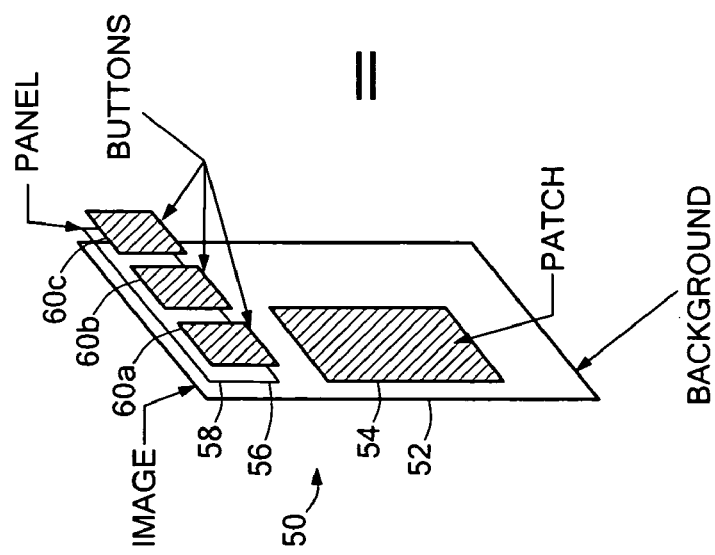
FIG. 3 is a block diagram of a graphical display having a plurality of two-dimensional display images.

Referring now to FIG. 3, an exemplary image 50 illustrates what a user views on a graphical display. The image 50 includes a background 52 having disposed thereon a tool bar 56 comprised of a panel 58 having three buttons 60a, 60b, 60c, and a patch 54. Though shown in exploded form for clarity, the buttons 60a-60c are in the plane of the background 52. All objects on the image 50 are, therefore, 2D images.

Referring now to FIG. 3A, a component scene graph 70 diagrammatically representing the image 50 of FIG. 3 is shown. The component scene graph 70 includes a background component 72 connected to panel and patch components 78, 74 respectively. Three button components 80a, 80b, 80c are coupled to panel component 78. It should be appreciated that the component scene graph 70 can be provided in a software graphical user interface.

Referring now to FIG. 3B, a graphics scene graph 100 associated with one of the buttons 80c of FIG. 3A includes as a variety of components 102-116, of which components 102, 106, and 112 are group components. The group component 112 is connected to area and text components 114, 116 respectively. The area and text components 114, 116 are associated with a single button image. The scene graph, which is comprised of scene graph data, underlies the component scene graph 70 of FIG. 3A and the graphics scene graph 100 of FIG. 3B. The scene graph is stored in the 3DGC, for example the 3DGC 38c of FIG. 2. Thus, FIGS. 3A and 3B illustrate diagrammatic representations of a scene graph used to provide the 2D image 50 of FIG. 3.

In another embodiment, this approach (i.e., using a 2D graphics scene graph and a 3DGC) allows a user to mix 2D images (e.g., button images) with 3D images. For example, in another embodiment, the 2D scene graph display commands can be intermixed with 3D scene graph display commands.

Figure 4:
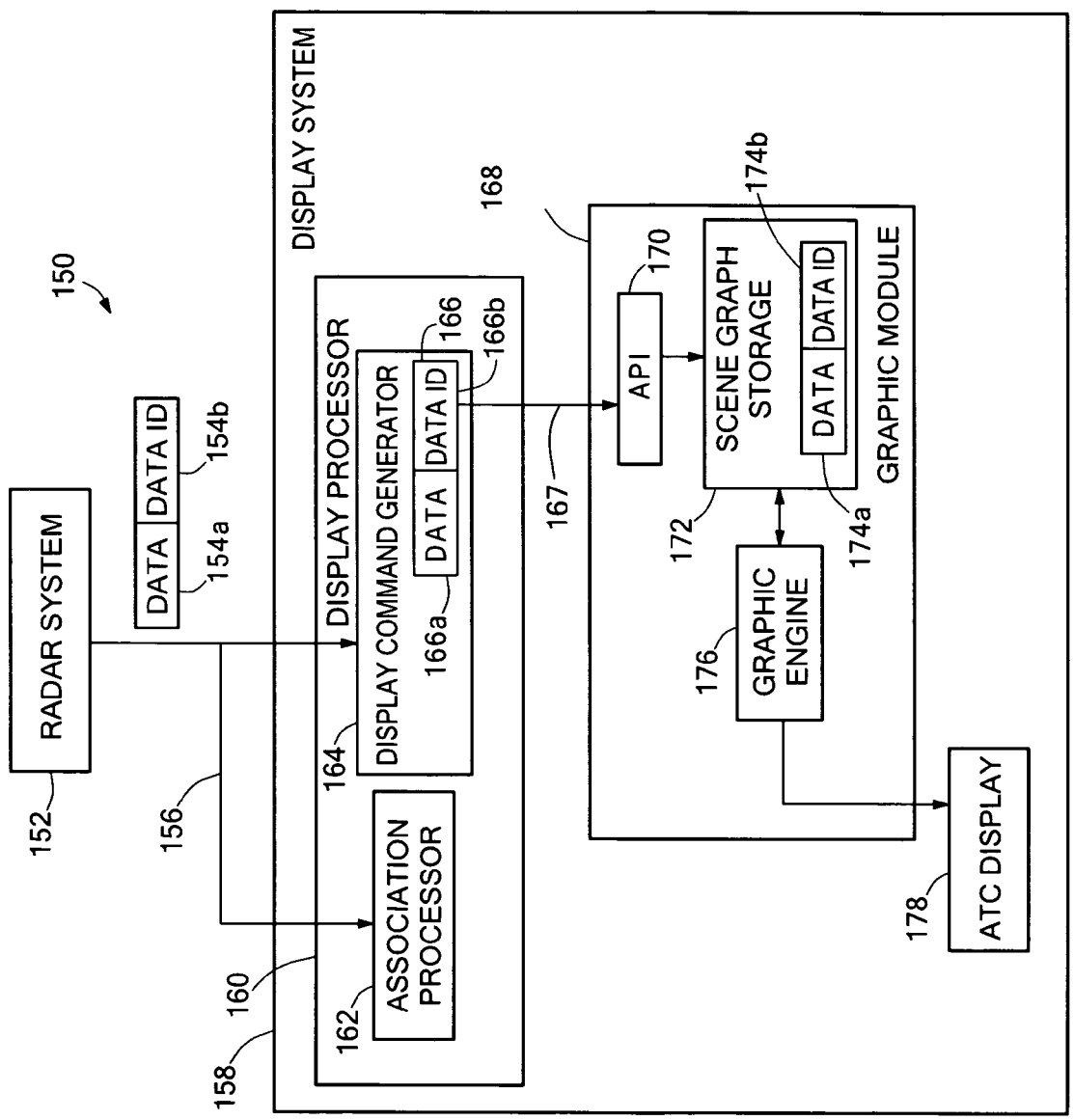
FIG. 4 is a block diagram of an exemplary display system in accordance with the present invention, used to provide an air traffic control (ATC) graphical display.

Referring now to FIG. 4, an air traffic control system 150 includes a radar system 152 coupled to a display system 158. In some cases, multiple radar systems are provided and each of the radar systems may be located at different physical locations to provide substantially continuous radar coverage over a geographic area larger than that which could be covered by any single radar system.

In operation, the radar system 152 emits radio frequency (RF) signals into a predetermined spatial region through an antenna as is generally known. Portions of the emitted RF signals intercept targets, which may correspond, for example, to aircraft traveling in the predetermined spatial region. Those portions of the emitted RF signals, which intercept the targets, are reflected from the targets as return or target signals, which are received by the radar.

In some cases, targets (e.g., aircraft) include a transponder, and the RF signal emitted by the radar system 152 includes a so-called interrogation signal. The interrogation signal interrogates the transponder on the target and in response to an appropriate interrogation signal, the transponder transmits a response signal from the target to the radar system 152.

For a given target, the radar system 152 provides a radar signal 156 including radar data 154a having an associated radar-data identifier (ID) 154b, which identifies the particular target. Either by way of the above mentioned transponder, or by way of a variety of known tracking algorithms provided by the radar system 152, the radar data 154a, (i.e., range, elevation, and azimuth position) is associated with the particular target, as indicated by the radar-data ID 154b.

Regardless of the manner in which the radar 152 detects the target and identifies the target with the radar-data ID 154b, the radar 152 provides the radar signals 156 to the display system 158, which includes a display system processor 160. The display system processor 160 receives the radar signals 156, and an association processor 162 therein associates the radar data 154a having the radar-data ID 154b with scene-graph-display-command data 166a having a scene-graph-display-command-data ID 166b. The association processor 162 also associates the radar data 154a having the radar-data ID 154b with particular scene graph data 174a having a scene-graph-data ID 174b. Particular scene graph data 174a having a scene-graph-data ID 174b, is associated with a particular image on an ATC display. In this way, the radar signals 156 are correctly associated with respective images on an ATC display 178.

Display commands 167, including the scene-graph-display-command-data 166a having the scene-graph-display-command-data ID 166b, are provided by the display command generator 164 to a graphics module 168 upon receiving the radar signals 156. In one embodiment, the graphics module 168 is a 3D graphics card (3DGC), which can be the same as or similar to the 3DGC 38c of FIG. 2. The scene graph commands 167 are interpreted by an application programming interface (API) 170, which updates a scene graph in response to the scene graph display commands 167. The scene graph, including updates, is stored in the scene graph storage module 172.

As described above, the scene graph, including updates, stored in the scene graph storage module 172, represents all images presented on the ATC display 178. A graphic engine 176 causes the images to be displayed on the ATC display 178.

Figure 5:
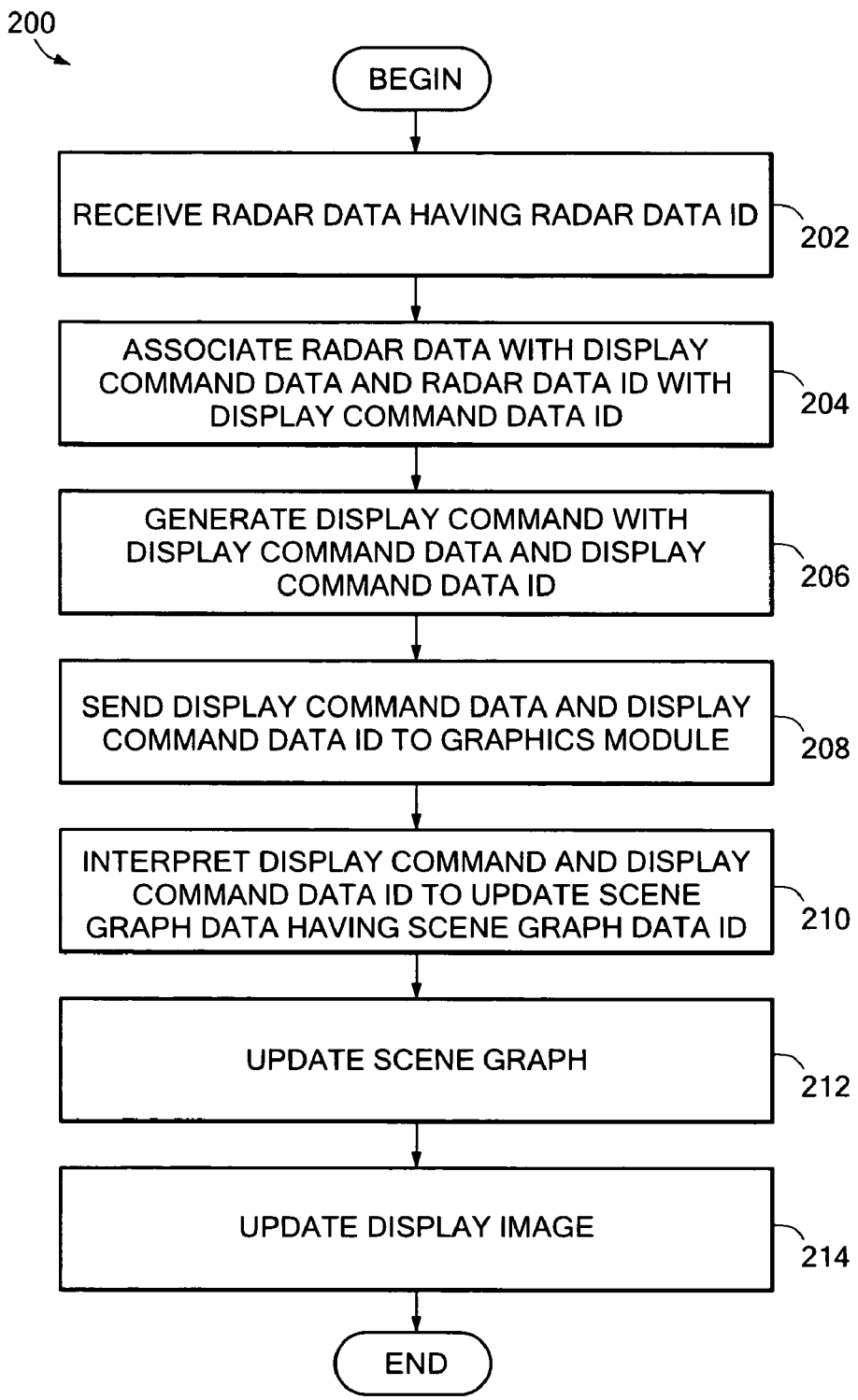
FIG. 5 is a flow diagram that illustrates an exemplary process for providing a two-dimensional image on a graphical display using a scene graph.

Referring now to FIG. 5, a flow diagram 200 shows the processing performed to update a scene graph based display image. The rectangular elements are herein denoted "processing blocks," and represent computer software instructions or groups of instructions.

Alternatively, the processing blocks represent steps performed by functionally equivalent circuits such as a digital signal processor circuit or an application specific integrated circuit (ASIC). The flow diagram does not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Processing begins at step 202 by acquiring a target in a radar and providing radar data (e.g., 154a, FIG. 4) having a radar-data ID (e.g., 154b, FIG. 4). The radar data and the radar-data ID are associated at step 204 with scene-graph-display-command data (e.g., 166a, FIG. 4) and a scene-graph-display-command-data ID (e.g., 166b, FIG. 4).

At step 206, a scene graph display command (e.g., 167, FIG. 4) is generated having the scene-graph-display-command data and the scene-graph-display-command-data ID. The scene graph display command is sent at step 208 to a graphics module (e.g., 168, FIG. 4). The graphics module can be the same as or similar to the graphics module 168 of FIG. 4

At step 210, the scene graph display command is interpreted, for example with an API which can be the same as or similar to the API 170 of FIG. 4, resulting at step 212 in an updated scene graph stored within a scene graph storage module. The scene graph storage module can be the same as or similar to the scene graph storage module 172 of FIG. 4.

Once the scene graph is updated, at step 214 a graphic engine (e.g., 176, FIG. 4) causes an update to display images presented on an ATC display (e.g., 178, FIG. 4), associated with the updated scene graph.

Figure 6:
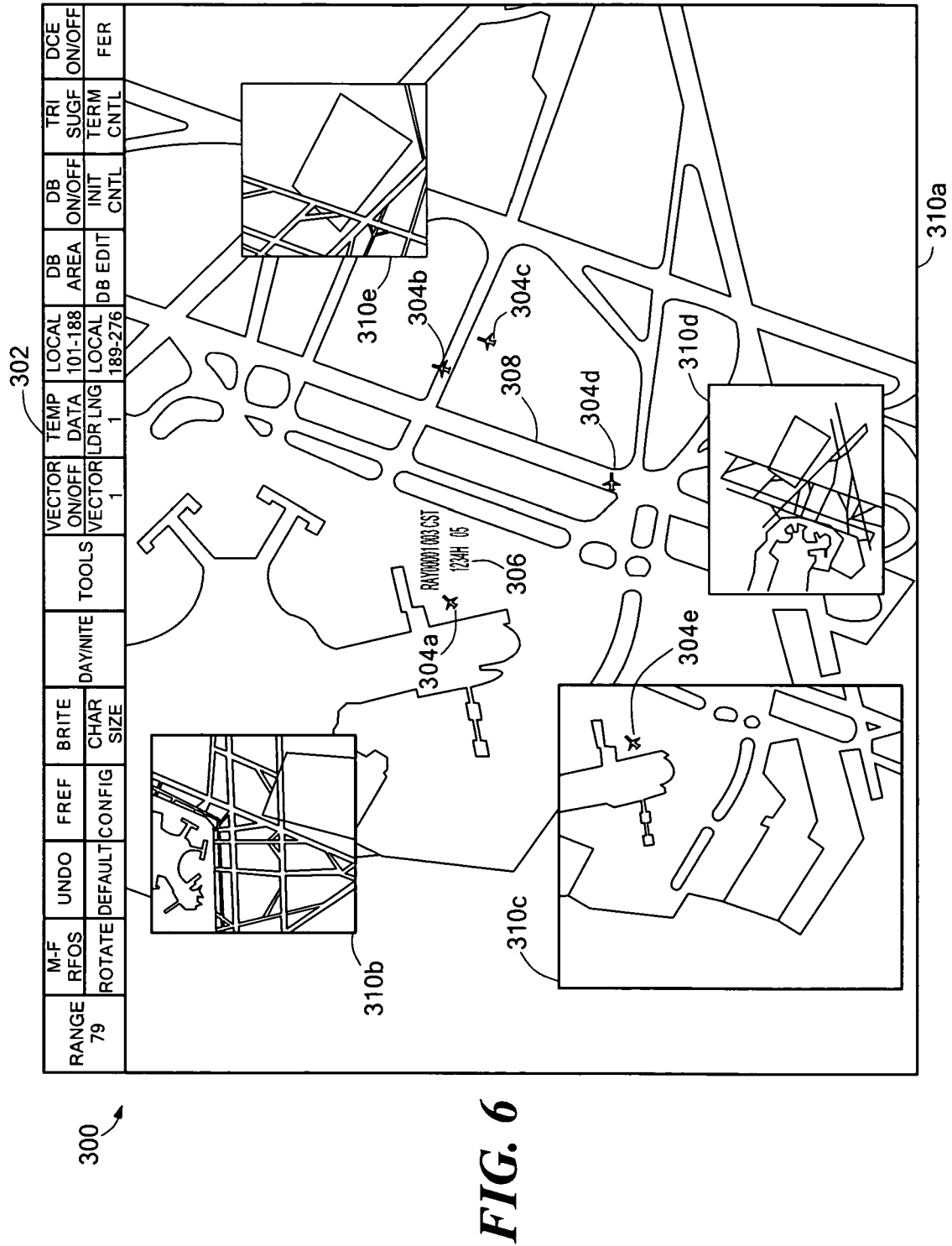
FIG. 6 is an exemplary ATC graphical display in accordance with the present invention provided by a scene graph and associated display commands.

Referring now to FIG. 6, an exemplary ATC graphical display 300 in accordance with the present invention is generated using a 2D scene graph and associated 2D scene graph display commands. The exemplary ATC graphical display 300 includes a variety of desktop images, including a menu having buttons with associated text, of which a button 302 is but one example, aircraft images 304a-304e, text 306 associated with the aircraft images, runway images 308 indicating an airport, and window images 310a-310e which can be zoomed and/or panned.

For the reasons described above, the ATC graphical display 300 images provided using 2D scene graph display commands can be rendered on a monitor much faster than the same images can be rendered on the monitor using primitive prior art "paint" display commands.

While only 2D images are shown on the ATC display 300, in another embodiment, 3D images, can also be shown in combination with 2D images. Also, while particular numbers of aircraft, windows, etc. are shown, any number of particular types of images can be shown in accordance with the present invention. In other embodiments, other types of images can be shown in place of, or in addition to the images shown on the ATC display 300, for example, images of people and images of ground vehicles, such as trucks.

While the scene graph based display for desktop applications is described above in conjunction with an ATC display, it should be appreciated that the 2D scene graph techniques, including 2D application software (e.g., 32, FIG. 2) and 2D API software (e.g., 38a, FIG. 2) can be associated with other applications, including, but not limited to, desktop applications having combinations of 2D windows, 2D text, and 2D graphics. For example, in one exemplary system, the 2D application software can include a word processor program adapted to provide 2D scene graph display commands corresponding to 2D letters and fonts, and the 2D API software can be adapted to interpret the 2D scene graph display commands and provide a 2D scene graph associated with the 2D letters and fonts. The 2D letters and fonts can be invoked as 2D images on a graphical display by other 2D display commands, for example "render" commands.

In yet another system, the 2D application can include map software adapted to provide 2D scene graph display commands representative of 2D map objects, such as 2D land features. The 2D API can be adapted to interpret the 2D map objects and provide 2D scene graph data associated with 2D map objects. The 2D map objects can be invoked as 2D images on a graphical display with other 2D display commands, for example "render" commands.

In yet another example, the 2D application can include schematic capture software used to generate circuit schematics. The schematic capture software can be adapted to provide 2D scene graph display commands representative of 2D schematic objects, such as 2D electrical components and interconnecting copper traces. The 2D API can be adapted to interpret the 2D schematic objects and provide 2D scene graph data associated with the 2D schematic objects. The 2D schematic objects can be invoked as 2D images on a graphical display with other 2D display commands, for example "render" commands.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer implemented method of providing a graphical display for a desktop application, comprising:
   providing an application programming interface associated with a three-dimensional graphics circuit module, the application programming interface to process two-dimensional scene graph commands;
   generating at least one two-dimensional scene graph command to create a respective at least one two-dimensional object;
   receiving the at least one two-dimensional scene graph command with the application programming interface;
   generating two-dimensional scene graph data with the application programming interface in accordance with the receiving the at least one two-dimensional scene graph command, the two-dimensional scene graph data including the at least one two-dimensional object;
   storing the two-dimensional scene graph data including the at least one two-dimensional object as part of a scene graph data group in a local memory diposed upon the three-dimensional graphics circuit module, wherein the three-dimensional graphics circuit module is coupled to a central processing unit, wherein the three-dimensional graphics circuit module includes a local processor coupled to the local memory;
   generating another at least one two-dimensional scene graph command associated with the at least one two-dimensional object;
   interpreting the another at least one two-dimensional scene graph command with the application programming interface; and
   rendering at least one two-dimensional image on the graphical display with the local processor in accordance with results of the interpreting, wherein the at least one two-dimensional image is derived from the at least one two-dimensional object stored in the local memory.

2. The method of claim 1, wherein the generating the another at least one two-dimensional scene graph command includes:
   receiving object data associated with a selected one of the at least one two-dimensional object; and
   associating the object data with the selected one of the at least one two-dimensional object to provide the another at least one two-dimensional scene graph command.

3. The method of claim 2, wherein the object data is provided by a radar system and is associated with at least one of an aircraft and a geographic feature.

4. The method of claim 1, wherein the at least one two-dimensional object represents an aircraft.

5. The method of claim 1, wherein the generating the two-dimensional scene graph data includes generating the scene graph data including at least one of a first two-dimensional scene graph data portion representing a land geography, and a second two-dimensional scene graph data portion representing one or more aircraft.

6. The method of claim 1, further comprising rendering at least one three-dimensional image on the graphical display in accordance with at least one three-dimensional object stored in the local memory.

7. The method of claim 1, wherein the two-dimensional scene graph data includes at least one text object, the at least one two-dimensional object includes at least one text character, and the at least one two-dimensional image includes at least one text character image.

8. The method of claim 1, wherein the three-dimensional graphics circuit module is a three-dimensional graphics circuit card.

9. The method of claim 1, wherein the three-dimensional graphics circuit module is configured to render all images on the graphical display via the local processor.

10. A computer-readable storage medium having computer readable code thereon for providing a graphical display for a desktop application, the medium comprising:
   instructions for providing an application programming interface associated with a three-dimensional graphics circuit module, the application programming interface to process two-dimensional scene graph commands;
   instructions for generating at least one two-dimensional scene graph command to create a respective at least one two-dimensional object;
   instructions for receiving that at least one two-dimensional scene graph command with the application programming interface;
   instructions for generating two-dimensional scene graph data with the application programming interface in accordance with the receiving the at least one two-dimensional scene graph command, the two-dimensional scene graph data including the at least one two-dimensional object;
   instructions for storing the two-dimensional scene graph data including the at least one two-dimensional object as part of a scene graph data group in a local memory disposed upon the three-dimensional graphics circuit module, wherein the three-dimensional graphics circuit module is coupled to a cenral processing unit, wherein the three-dimensional graphics circuit module includes a local processor coupled to the local memory;
   instructions for generating another at least one two-dimensional scene graph command associated with the at least two-dimensional object;
   instructions for interpreting the another at least one two-dimensional scene graph command with the application programming interface; and
   instructions for rendering at least two-dimensional image on the graphical display with the local processor in accordance with results of the instructions for interpreting, wherein the at least one two-dimensional image is derived from the at least one two-dimensional object stored in the local memory.

11. The computer readable-storage medium of claim 10, wherein the instructions for generating the another at least one two-dimensional scene graph command include:
   instructions for receiving object data associated with a selected one of the at least one two-dimensional object; and
   instructions for associating the object data with the selected one of the at least one two-dimensional object to provide the another at least one two-dimensional scene graph command.

12. The computer-readable storage medium of claim 11, wherein the object data is provided by a radar system and is associated with at least one of an aircraft and a geographic feature.

13. The computer-readable storage medium of claim 10, wherein the at least one two-dimensional object represents an aircraft.

14. The computer-readable storage medium of claim 10, wherein the instructions for generating the two-dimensional scene graph data include instructions for generating the two-dimensional scene graph data including at least one of a first two-dimensional scene graph data portion representing a land geography, and a second two-dimensional scene graph data portion representing one or more aircraft.

15. The computer-readable storage medium of claim 10, further comprising instructions for rendering at least one three-dimensional image on the graphical display in accordance with at least one three-dimensional object stored in the local memory.

16. The computer-readable storage medium of claim 10, wherein the two-dimensional scene graph data includes at least one text object, the at least one two-dimensional object includes at least one text character, and the at least one two-dimensional image includes at least one text character image.

17. The computer-readable storage medium of claim 10, wherein the three-dimensional graphics circuit module is a three-dimensional graphics circuit card.

18. The computer-readable storage medium of claim 10, wherein the three-dimensional graphics circuit module is configured to render all images on the graphical display via the local processor.

19. A radar system for providing a graphical display, comprising:
   a radar for providing radar data representative of an aircraft, wherein the radar data includes a range, an elevation, and an azimuth position of the aircraft, and wherein the radar data includes a radar-data identifier that associates the radar data with the aircraft;
   a display processor having a scene graph command generator coupled to receive the radar data, the display processor for generating a two-dimensional scene graph command to create two-dimensional scene graph data including a respective two-dimensional object representative of the aircraft, and also for generating another two-dimensional scene graph command to render on the graphical display a two-dimensional image representative of the two-dimensional object, wherein the display processor includes an association processor to:
   receive the radar data; and
   associate the radar data with the two-dimensional object representative of the aircraft;
   an application programming interface, the application programming interface coupled to receive the two-dimensional scene graph command and configured to generate the two-dimensional scene graph data including the two-dimensional scene graph object representative of the aircraft in accordance with the two-dimensional scene graph command; and
   a three-dimensional graphics circuit module coupled to the display processor and associated with the application programming interface, wherein the three-dimensional graphics circuit module includes a local memory disposed thereon and a local processor coupled to the local memory, wherein the three-dimensional graphics circuit module is configured to store the two-dimensional scene graph data including the two-dimensional object as part of a scene graph data group in the local memory, wherein the application programming interface is further configured to interpret the another two-dimensional scene graph command, wherein the three-dimensional graphics circuit module is configured to generate graphical display via the local processor in accordance with results of interpretation of the another two-dimensional scene graph command, resulting in the two-dimensional image on the graphical display, wherein the two-dimensional image is derived from the two-dimensional object stored in the local memory.

20. They system of claim 19, wherein the radar data is also associated with the geographic feature.

21. The system of claim 19, wherein the scene graph command generator is also configured to generate a three-dimensional scene graph command to create a respective three-dimensional object.

22. The system of claim 19, wherein the two-dimensional scene graph data includes a text object, the two-dimensional object includes a text character, and the two-dimemsional image includes text character image

23. The system of claim 19, wherein the three-dimensional graphics circuit module is a three-dimensional graphics circuit card.

24. The system of claim 19, wherein the three-dimensional graphics circuit module is configured to render all images on the graphical display via the local processor.

* * * * *